(12) United States Patent
MacConnell (10) Patent No.: US 10,902,864 B2
(45) Date of Patent: Jan. 26, 2021

(54) MIXED-REALITY AUDIO INTELLIGIBILITY CONTROL

(71) Applicant: Microsoft Technology Licensing, LLC, Redmond, WA (US)

(72) Inventor: Duncan Og MacConnell, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 103 days.

(21) Appl. No.: 16/234,003

(22) Filed: Dec. 27, 2018

(65) Prior Publication Data
US 2020/0211578 A1    Jul. 2, 2020

(51) Int. Cl.
  *G10L 21/0364* (2013.01)
  *G10L 25/48* (2013.01)
(52) U.S. Cl.
  CPC .......... *G10L 21/0364* (2013.01); *G10L 25/48* (2013.01)
(58) Field of Classification Search
  None
  See application file for complete search history.

(56) References Cited

U.S. PATENT DOCUMENTS

| 7,415,120 | B1 * | 8/2008 | Vaudrey | H03G 3/32 381/109 |
| 2003/0044028 | A1 * | 3/2003 | Cranfill | H03G 3/301 381/107 |
| 2008/0049948 | A1 * | 2/2008 | Christoph | H04S 7/301 381/86 |
| 2011/0221656 | A1 | 9/2011 | Haddick et al. | |
| 2012/0209601 | A1 * | 8/2012 | Jing | H03G 3/32 704/226 |
| 2013/0142360 | A1 * | 6/2013 | Potard | H03G 9/18 381/98 |
| 2015/0281853 | A1 * | 10/2015 | Eisner | H04R 25/505 381/312 |
| 2016/0277855 | A1 * | 9/2016 | Raz | H04R 3/04 |
| 2017/0155369 | A1 * | 6/2017 | Wang | H03G 3/3089 |
| 2018/0302734 | A1 * | 10/2018 | Choi | H04S 7/30 |
| 2020/0053464 | A1 * | 2/2020 | Peters | G06F 3/167 |

FOREIGN PATENT DOCUMENTS

WO   2020033228 A1   2/2020

OTHER PUBLICATIONS

"International Search Report and Written Opinion Issued in PCT Application No. PCT/US19/067703", dated Apr. 17, 2020, 12 Pages.

* cited by examiner

*Primary Examiner* — Fariba Sirjani
(74) *Attorney, Agent, or Firm* — Buckley, Maschoff & Talwalkar LLC (57) ABSTRACT

A system and method includes presentation of a mixed-reality environment to a user, presentation of a first audio control to the user within the mixed-reality environment, detection of a manipulation by the user of the first audio control within the mixed-reality environment, determination of a first value of an audio-related parameter associated with speech intelligibility based on the manipulation, determination of two or more audio processing parameter values associated with speech intelligibility based on the first value, reception of first speech audio signals, application of audio processing to the first speech audio signals based on the determined two or more audio processing parameter values to generate second speech audio signals, and transmission of the second speech audio signals to a loudspeaker system for playback to the user.

15 Claims, 6 Drawing Sheets

MIXED-REALITY AUDIO INTELLIGIBILITY CONTROL

BACKGROUND

Modern computing applications may capture and playback audio of a user's speech. Such applications include videoconferencing applications, multi-player gaming applications, and audio messaging applications. The audio often suffers from poor quality both at capture and playback.

For example, a typical microphone used to capture speech audio for a computing application is built-in to a user device, such as a smartphone, tablet or notebook computer. These microphones capture low-quality audio which exhibits, for example, low signal-to-noise ratios and low sampling rates. Even off-board, consumer-grade microphones provide poor quality audio when used in a typical audio-unfriendly physical environment.

Moreover, a user typically lacks the knowledge and/or the time to control audio processing so as to improve the intelligibility of the recorded audio during playback. Such control would involve the tuning of several individual audio processing parameters over several iterative steps. Such steps cannot be easily hardcoded due to differences in voice pitch, frequencies, etc.

Systems are desired to provide improved speech intelligibility via intuitive and efficient user control over speech audio processing.

DETAILED DESCRIPTION

The following description is provided to enable any person in the art to make and use the described embodiments. Various modifications, however, will remain apparent to those in the art.

Embodiments described herein provide a technical solution to the technical problem of addressing poor-quality speech audio playback in a computing environment. According to some embodiments, multiple audio processing parameters are abstracted into a single, multidimensional user control. In a mixed-reality environment, such a control may support simple interaction, reduce complexity and efficiently increase intelligibility of recorded speech content.

Figure 1:
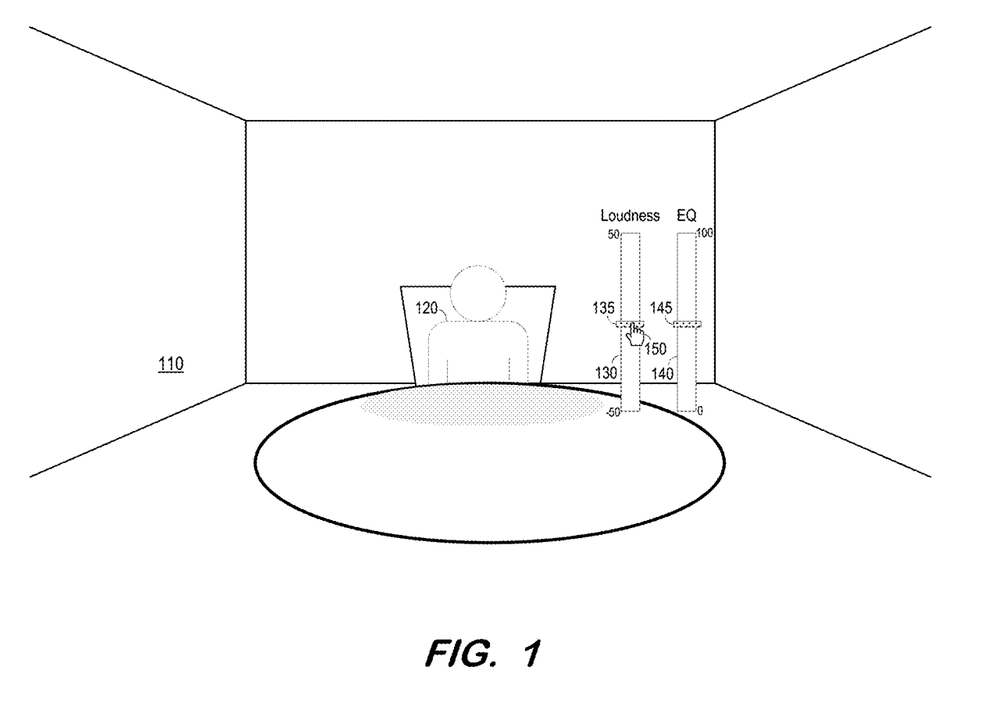
FIG. 1 depicts a mixed-reality environment including multimodal audio controls according to some embodiments.

As an initial introduction to some embodiments, FIG. 1 illustrates a mixed-reality environment according to some embodiments. Some embodiments may be used in conjunction with mixed-, augmented-, and/or virtual-reality systems, as well as in conventional computer display systems.

According to the example, a user is looking at a mixed-reality display while physically located within in environment 110. Every object shown in FIG. 1 is also located in environment 110 (i.e., the user sees the "real" object), except for user 120. The image of user 120 may be acquired by a camera of a remote system and provided to the mixed-reality display via a communication application (e.g., a videoconferencing application). As is known in the art, the mixed-reality display operates to insert an image of user 720 into the scene viewed by the current user.

Environment 110 includes Loudness control 130 and EQ control 140. Controls 130 and 140 may be displayed as holographic images or in any other image format. Each of controls 130 and 140 is associated with a respective slider 135 and 145. According to some embodiments, the current user manipulates a slider 135 or 145 using an input device (e.g., a hand, a mixed-reality controller) to set a value corresponding to the associated control 130 or 140.

Controls 130 and 140 may be manipulated to affect the processing of speech audio being played back to the user within environment 110. For example, speech audio signals of the current user or of user 120 may be recorded and played back in environment 110 such that it may be perceived by the current user. Moving either of slider 135 or 145 changes values of two or more audio processing parameters used to process the audio signals prior to playback thereof.

According to one example, Loudness control 130 is bipolar with selectable values ranging from −50 to 50 in increments of one. Embodiments are not limited to this range or granularity of values. According to some embodiments, selection of values less than 0 (e.g., via slider 135) will increase the compression (if any) applied to the speech audio signals. Compression reduces the dynamic range of the signals, causing quiet sounds to become louder, and loud sounds to become quieter. Selection of values greater than 0 will cause expansion of the signal (e.g., to compensate for strong compression from recording hardware). Expansion increases the dynamic range of the signal, causing quiet sounds to become quieter, and louder sounds to become louder.

Also according to an example, EQ control 140 is unipolar with selectable values ranging from 0 to 100 in increments of one. Embodiments are also not limited to this range or granularity of values. Increasing the value of EQ control 140 increases the frequency (i.e., the bandwidth) of an equalization filter applied to the input speech audio signal. In some embodiments, such control facilitates the application of an equalization filter corresponding to the speaker's voice. Increasing the value of EQ control 140 may also change the profile (shape) of the equalization filter. For example, as the bandwidth moves up in frequency range, the size of the equalization filter changes due to the logarithmic relationship between frequency and perception.

Embodiments are not limited to two multimodal controls, nor to a slider input metaphor. One or more multimodal controls may be displayed, and each control may comprise any suitable type of control (control knob, selectable buttons, etc.) that are or become known.

Figure 2:
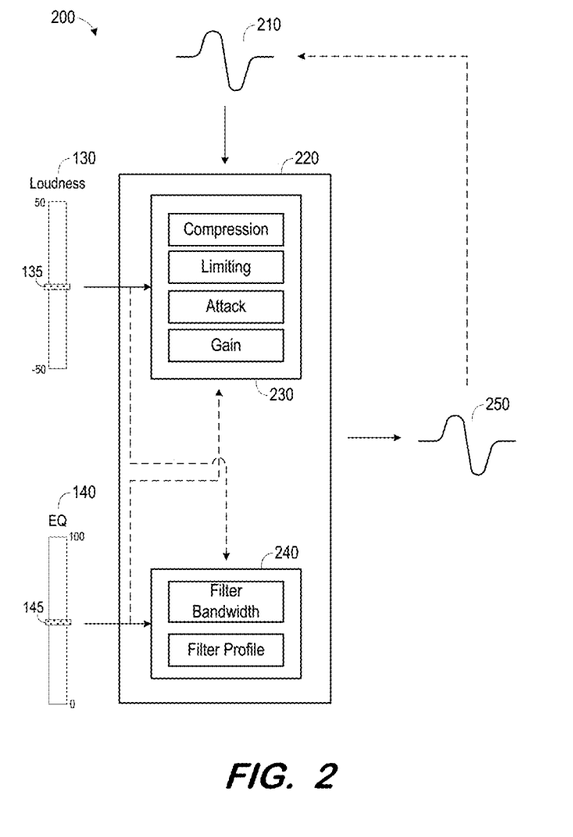
FIG. 2 is a block diagram of a system to process speech audio signals based on multimodal audio control values according to some embodiments.

FIG. 2 is a block diagram of system 200 to process speech audio signals based on multimodal audio control values according to some embodiments. Generally, processing system 220 receives input speech audio signal 210 and generates output speech audio signal 250 based on control values received from a user via controls 130 and 140. Processing system 220 may comprise any one or more suitable computing devices, including but not limited to a desktop or laptop computer, a computer server, and a mixed-reality headset.

As shown, the single value selected using Loudness control 130 may determine several audio processing parameter values represented within Loudness processing component 230. For example, based on a value selected by slider 135 of Loudness control 130, processing component 230 may determine one or more parameter values defining a compression function, one or more parameter values defining a limiting function, one or more parameter values defining an attack function, and one or more parameter values defining a gain function. Each determination may be based on a calculation associating loudness values with one or more parameter values of each processing function.

The single value selected using EQ control 140 may also determine several audio processing parameter values, represented within EQ processing component 240. Based on a value selected by slider 145 of EQ control 140, processing component 240 may determine an equalization filter bandwidth range and an equalization filter profile. According to some embodiments, ranges of values of EQ control 140 correspond to respective pre-defined bandwidth ranges and filter profiles. For example, values between 0 and 30 may correspond to a first bandwidth range and a first filter profile, values between 30 and 80 may correspond to a second bandwidth range and a second filter profile, and values between 80 and 100 may correspond to a third bandwidth range and a third filter profile. In some embodiments, component 240 calculates the equalization filter bandwidth range and the equalization filter profile based on the selected value of EQ control 140.

As illustrated by the dashed lines of FIG. 2, in some embodiments component 240 may determine the equalization processing parameter values based at least in part on the selected value of loudness control 130. Similarly, component 230 may determine the loudness-related processing parameter values based at least in part on the selected value of EQ control 130.

Figure 3:
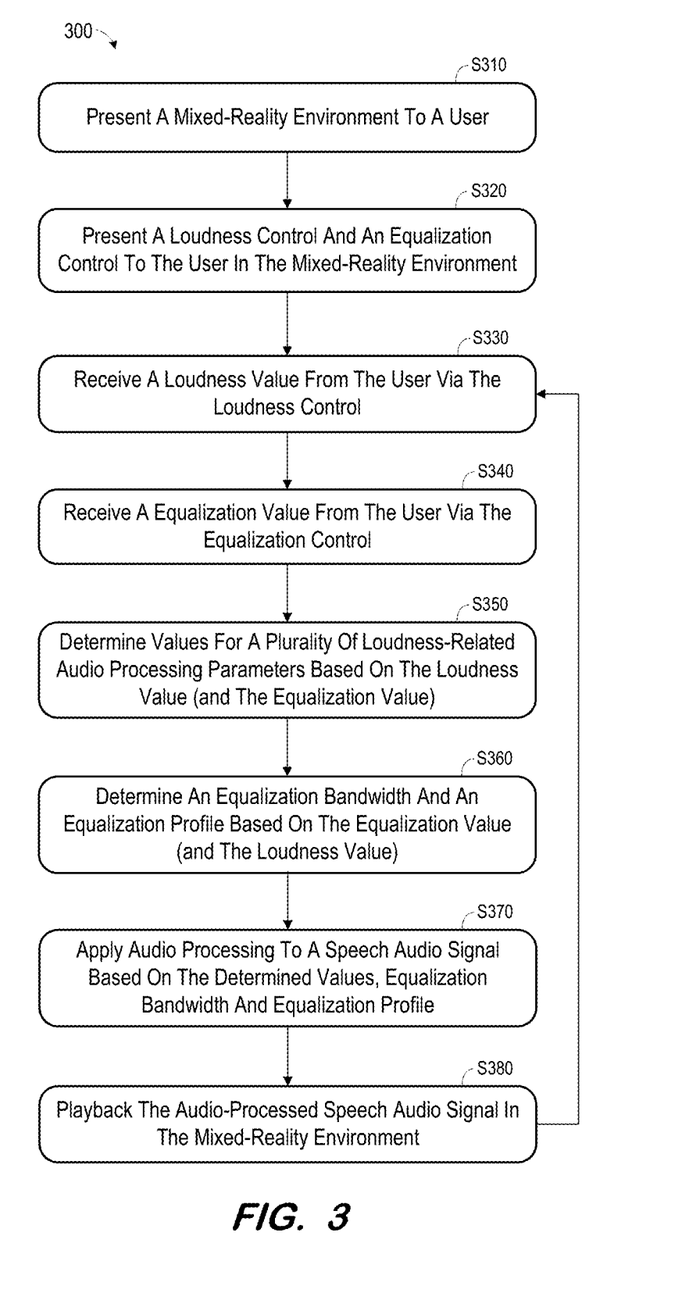
FIG. 3 is a flow diagram of a process speech audio signals based on multimodal audio control values according to some embodiments.

FIG. 3 is a flow diagram of process 300 according to some embodiments. Process 300 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Embodiments are not limited to the examples described below.

A mixed-reality environment is presented to a user at S310. The mixed-reality environment may be presented via execution of an application such as a videoconferencing, gaming, or other application providing audio recording and playback. The mixed-reality environment may include zero or more real objects and zero or more computer-generated images in the user's field of vision. The mixed-reality environment may be presented by a mixed-reality headset, a flat-panel display, or any suitable one or more systems.

At S320, a loudness control and an equalization control are presented to the user in the mixed-reality environment. As described with respect to FIG. 1, S320 may comprise presentation of Loudness control 130 and EQ control 140 as holographic images or in any other image format.

The controls may be presented in response to a command input by the user via an input device. The command may comprise a command to open a Settings or Audio menu associated with the application. In some embodiments, the command is a hand gesture and the input device is a motion sensor.

A Loudness value is received from the user via the Loudness control at S330, and an EQ value is received from the user at S340. Continuing with the FIG. 1 example, the user may manipulate slider 135 or 145 using an input device (e.g., a hand, a mixed-reality controller) to set a value corresponding to the associated control 130 or 140.

The user may input the Loudness and EQ values in response to hearing speech audio signals played back in the mixed-reality environment. For example, the user may speak and hear his own voice played back through loudspeakers, or may hear another user's (e.g., user 120's) speech audio signals being played back. These audio signals are processed based on an initial set of audio-processing parameters, an initial equalization filter bandwidth, and an initial equalization filter profile.

The user may then manipulate one or both of controls 130 and 140 in an attempt to increase the intelligibility of the played back speech audio signals. If the user chooses to manipulate only one control, only one of a Loudness value and an EQ are received at S330 and S340.

Next, at S350, values are determined for a plurality of loudness-related audio processing parameters based on the received Loudness value. As described above, the determination at S350 may also be based on the received EQ value. Examples of Loudness-related audio processing parameters for which values may be determined at S350 include but are not limited to Compression, Limiting, Attack Value and Gain. The value of a parameter may be determined at S350 based on a function associated with the parameter which takes the user-provided Loudness value as input, based on a look-up table for which the user-provided Loudness value is an index, or by any other suitable mechanism.

An equalization bandwidth and an equalization profile are determined at S360 based on the received equalization value. In some embodiments, certain ranges of equalization values correspond to respective pre-defined bandwidths and equalization profiles. Accordingly, a pre-defined bandwidth and equalization profile may be determined at S360 by identifying a range in which the received equalization value falls. In some embodiments, the equalization filter bandwidth range and the equalization filter profile are calculated based on functions which take the received equalization value as input. Such functions may also depend on the received Loudness value.

Audio processing is then applied to received speech audio signals at S370. The audio processing utilizes the values determined for various audio processing parameters at S350, and the equalization bandwidth and equalization profile determined at S360. It should be noted that if no Loudness value or equalization value is received from a user at S330 or S340, the initial speech audio signal processing and equalization scheme continues to be used.

The processed speech audio signal is played back in the mixed-reality environment at S380. Flow then returns to S330, at which point the user may again choose to manipulate the Loudness control and/or the EQ control to increase the intelligibility of the played back signal. If so, flow continues therefrom as described above.

Figure 4:
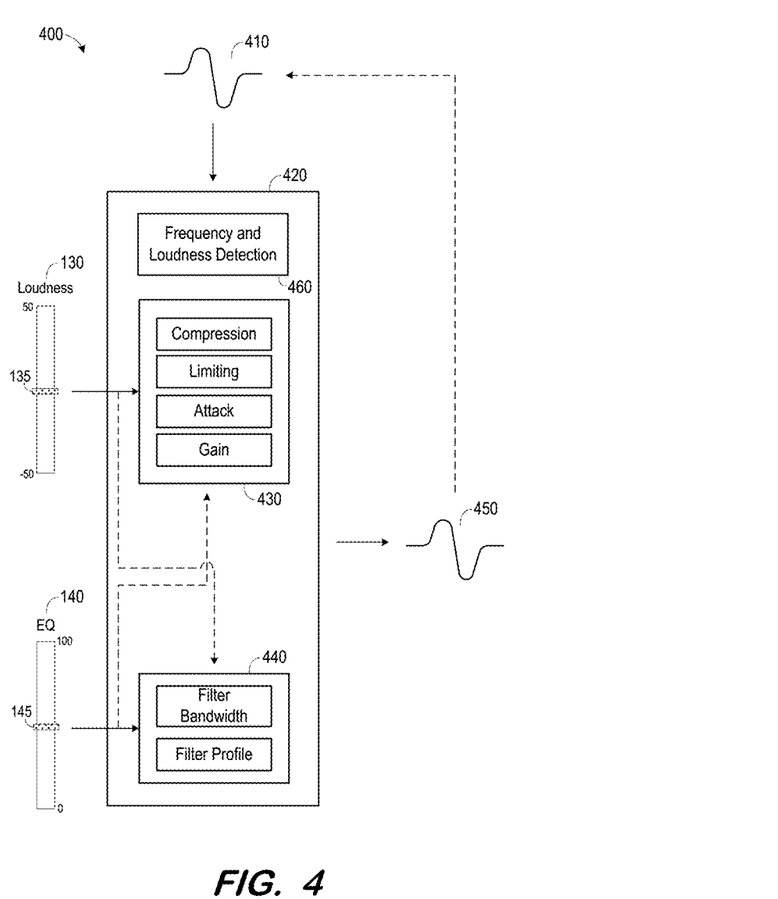
FIG. 4 is a block diagram of a system to process speech audio signals based on multimodal audio control values according to some embodiments.

As mentioned above, an initial audio processing scheme is applied prior to user selection of Loudness or EQ values. FIG. 4 illustrates system 400 including components for determining the initial audio processing scheme. Specifically, frequency and loudness detection component 460 may determine a frequency and loudness based on input signal 410 and pass these values to component 430 for determination of initial values of Compression, Limiting, Attack and Gain audio processing parameters, and to component 440 for determination of an initial equalization frequency bandwidth and equalization profile.

For example, component 460 may determine a signal-to-noise ratio (and/or decibel level) level associated with input signal 410 and component 430 changes compression, limiting and scaling values based on the detected ratio and/or level. Component 460 may also estimate a fundamental frequency of signal 410 used by component 440 to determine an initial equalization frequency bandwidth and equalization profile.

Figure 5:
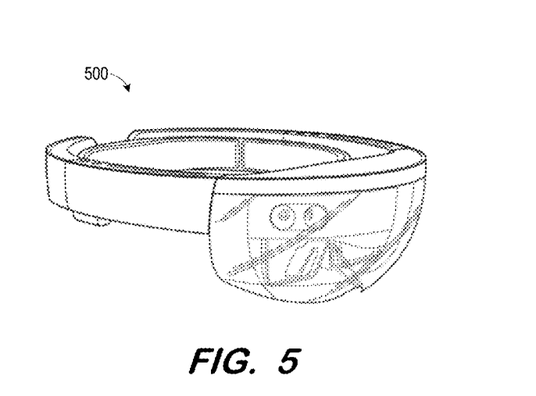
FIG. 5 depicts an audio/video device to display multimodal audio controls and implement speech audio signal processing according to some embodiments.

FIG. 5 is a view of head-mounted audio/video device 500 which may support multimodal audio controls in a mixed-reality environment according to some embodiments. Embodiments are not limited to device 500.

Device 500 includes a speaker system for presenting spatialized sound and a display for presenting images to a wearer thereof. The images may completely occupy the wearer's field of view, or may be presented within the wearer's field of view such that the wearer may still view other objects in her vicinity. The images may be holographic.

Device 500 may also include sensors (e.g., cameras and accelerometers) for determining the position and motion of device 500 in three-dimensional space with six degrees of freedom. Data received from the sensors may assist in determining the size, position, orientation and visibility of images displayed to a wearer.

Figure 6:
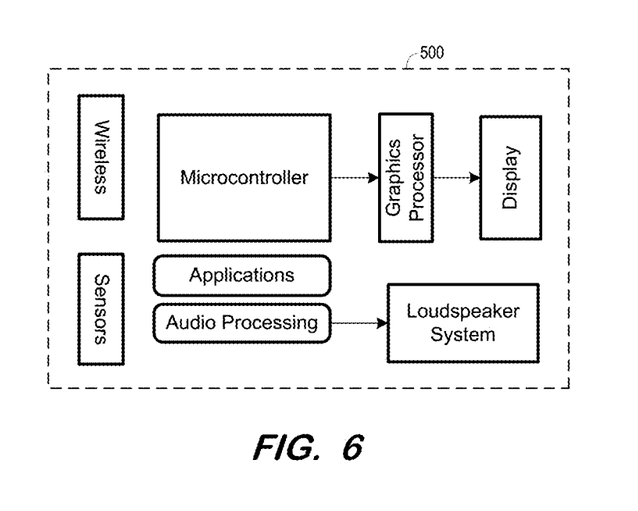
FIG. 6 is an internal block diagram of an audio/video device to display multimodal audio controls and implement speech audio signal processing according to some embodiments.

According to some embodiments, device 500 executes process 300. FIG. 6 is an internal block diagram of some of the components of device 500 according to some embodiments. Each component may be implemented using any combination of hardware and software.

Device 500 includes a wireless networking component to receive and transmit application/environment data. The data may be received via execution of a communication application on device 500 and/or on a computing system to which device 500 is wirelessly coupled. The data may include remotely-recorded speech audio signals but embodiments are not limited thereto.

The sensors of device 500 may detect room acoustics and the position of objects within the room, as well as the position of device 500 within the room. The audio processing component of device 500 may utilize this information to process the speech audio signals generated according to some embodiments. The thus-processed audio signals are then provided to the spatial loudspeaker system of device 500 for playback and perception by the wearer.

As shown in FIG. 6, device 500 may also include a graphics processor to assist in presenting images on its display. Such images may comprise mixed-reality images of multimodal audio controls as depicted in FIG. 1.

Figure 7:
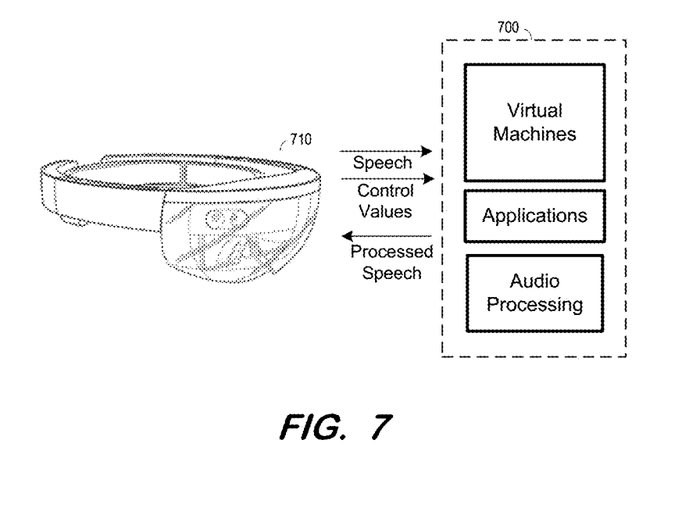
FIG. 7 is a block diagram of a cloud computing system which may implement speech audio signal processing according to some embodiments.

FIG. 7 illustrates virtual machine-based system 700 according to some embodiments. System 700 may be cloud-implemented and may include any number of virtual machines, virtual servers and cloud storage instances. System 700 may execute an application providing mixed-reality experience and audio processing according to some embodiments.

Device 710 may communicate with the application executed by system 700 to provide recorded speech audio signals thereto. System 700 may receive the speech audio signals, process the signals, and provide the processed speech signals to device 710.

As described above, device 710 may play back the signals and present one or more multimodal controls to a user in a mixed-reality environment. The user may manipulate one or more of the controls to transmit one or more control values to system 700. For each of the one or more control values, system 700 determines two or more audio processing parameter values associated with speech intelligibility, processes speech audio signals received from device 710 based thereon, and returns the processed signals to device 710. Device 710 may further process the received speech signals prior to playback, for example based on context information local to device 710.

Each functional component described herein may be implemented at least in part in computer hardware, in program code and/or in one or more computing systems executing such program code as is known in the art. Such a computing system may include one or more processing units which execute processor-executable program code stored in a memory system.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state Random Access Memory (RAM) or Read Only Memory (ROM) storage units. Embodiments are therefore not limited to any specific combination of hardware and software.

Those in the art will appreciate that various adaptations and modifications of the above-described embodiments can be configured without departing from the claims. Therefore, it is to be understood that the claims may be practiced other than as specifically described herein.

What is claimed is:

1. A computing system comprising:
   a display;
   one or more processing units to execute processor-executable program code to cause the computing system to:
   receive a user manipulation of a first audio control presented within a mixed-reality environment on the display to select a first value, the selected first value being a value of a loudness-related parameter associated with speech intelligibility;
   receive a user manipulation of a second audio control to select a second value, the second audio control presented within the mixed-reality environment on the display contemporaneously with presentation of the first audio control and the selected second value being a value of an equalization-related parameter associated with speech intelligibility;
determine a first two or more loudness-related audio processing parameter values associated with speech intelligibility based on the selected first value and on the selected second value;
determine a second two or more equalization-related audio processing parameter values associated with speech intelligibility based on the selected second value and on the selected first value;
apply audio processing to first speech audio signals based on the determined first two or more loudness-related audio processing parameter values and the determined second two or more equalization-related audio processing parameter values to generate second speech audio signals; and
transmit the second speech audio signals to a playback system.

2. A computing system according to claim 1, wherein the first two or more loudness-related audio processing parameter values comprise a compression value and a limiting value.

3. A computing system according to claim 1, wherein the second two or more equalization-related audio processing parameter values comprise an equalization filter bandwidth and an equalization filter profile.

4. A computing system according to claim 1, wherein the first two or more loudness-related audio processing parameter values comprise a compression value and a limiting value, and
wherein the second two or more equalization-related audio processing parameter values comprise an equalization filter bandwidth and an equalization filter profile.

5. A computing system according to claim 1, wherein determination of the first two or more loudness-related audio processing parameter values comprises determination of a third two or more audio processing parameter values if the selected first value is within a first range of two or more values, determination of a fourth two or more audio processing parameter values if the selected first value is within a second range of two or more values, and determination of a fifth two or more audio processing parameter values if the selected first value is within a third range of two or more values, and
wherein at least one of the third, fourth and fifth ranges spans a smaller set of values than another one of the third, fourth and fifth ranges.

6. A computer-implemented method comprising:
detecting a manipulation by a user of a first audio control presented within a mixed-reality environment;
determining a first value based on the manipulation, the first value being a loudness-related parameter associated with speech intelligibility;
detecting a second manipulation by the user of a second audio control presented within the mixed-reality environment contemporaneously with presentation of the first audio control;
determining a second value based on the second manipulation, the second value being a equalization-related parameter associated with speech intelligibility;
determining a first two or more loudness-related audio processing parameter values associated with speech intelligibility based on the first value and the second value;
determining a second two or more equalization-related audio processing parameter values associated with speech intelligibility based on the first value and the second value;
receiving first speech audio signals;
applying audio processing to the first speech audio signals based on the determined first two or more loudness-related audio processing parameter values and on the determined second two or more equalization-related audio processing parameter values to generate second speech audio signals; and
transmitting the second speech audio signals to a playback system for playback to the user.

7. A method according to claim 6, wherein the first two or more loudness-related audio processing parameter values comprise a compression value and a limiting value.

8. A method according to claim 6, wherein the second two or more equalization-related audio processing parameter values comprise an equalization filter bandwidth and an equalization filter profile.

9. A method according to claim 6, wherein the first two or more loudness-related audio processing parameter values comprise a compression value and a limiting value, and
wherein the second two or more equalization-related audio processing parameter values comprise an equalization filter bandwidth and an equalization filter profile.

10. A method according to claim 6, wherein determining the first two or more loudness-related audio processing parameter values comprises determining a third two or more audio processing parameter values if the selected first value is within a first range of two or more values, determining a fourth two or more audio processing parameter values if the selected first value is within a second range of two or more values, and determining a fifth two or more audio processing parameter values if the selected first value is within a third range of two or more values, and
wherein at least one of the third, fourth and fifth ranges includes a smaller set of values than another one of the third, fourth and fifth ranges.

11. A computing system to:
detect a selection of a first value by a user via a first audio control presented within a mixed-reality environment, the first value being a value of a loudness-related parameter;
detect a second selection of a second value by the user via a second audio control presented within the mixed-reality environment contemporaneously with presentation of the first audio control, the second value being a value of an equalization-related parameter;
determine a first two or more loudness-related audio processing parameter values based on the first value and on the second value;
determine a second two or more equalization-related audio processing parameter values based on the first value and on the second value;
receive first speech audio signals;
apply audio processing to the first speech audio signals based on the determined first two or more loudness-related audio processing parameter values and on the second two or more equalization-related audio processing parameter values to generate second speech audio signals; and
transmit the second speech audio signals to a playback system for playback to the user.

12. A system according to claim 11, wherein the first two or more loudness-related audio processing parameter values comprise a compression value and a limiting value.

13. A system according to claim 11, wherein the second two or more equalization-related audio processing parameter values comprise an equalization filter bandwidth and an equalization filter profile.

14. A system according to claim 11, wherein the first two or more loudness-related audio processing parameter values comprise a compression value and a limiting value, and
wherein the second two or more equalization-related audio processing parameter values comprise an equalization filter bandwidth and an equalization filter profile.

15. A system according to claim 11,
wherein determining the first two or more loudness-related audio processing parameter values comprises determining a third two or more audio processing parameter values if the selected first value is within a first range of two or more values, determining a fourth two or more audio processing parameter values if the selected first value is within a second range of two or more values, and determining a fifth two or more audio processing parameter values if the selected first value is within a third range of two or more values, and
wherein at least one of the third, fourth and fifth ranges includes a smaller set of values than another one of the third, fourth and fifth ranges.

\* \* \* \* \*